United States Patent
Ishizaki

(10) Patent No.: US 11,420,855 B2
(45) Date of Patent: Aug. 23, 2022

(54) OBJECT DETECTION DEVICE, VEHICLE, AND OBJECT DETECTION PROCESS

(71) Applicant: KABUSHIKI KAISHA TOYOTA JIDOSHOKKI, Kariya (JP)

(72) Inventor: Masataka Ishizaki, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 40 days.

(21) Appl. No.: 17/034,613

(22) Filed: Sep. 28, 2020

(65) Prior Publication Data

US 2021/0101791 A1 Apr. 8, 2021

(30) Foreign Application Priority Data

Oct. 4, 2019 (JP) .............................. JP2019-183767

(51) Int. Cl.
*B66F 9/075* (2006.01)
*G06T 7/70* (2017.01)
(Continued)

(52) U.S. Cl.
CPC .......... *B66F 9/0755* (2013.01); *G06K 9/6276* (2013.01); *G06T 7/70* (2017.01);
(Continued)

(58) Field of Classification Search
CPC .... G06K 9/00335; G06K 9/0061; G06K 9/20; G06K 9/00362; G06K 9/00805;
(Continued)

(56) References Cited

U.S. PATENT DOCUMENTS

| 2003/0210807 A1* | 11/2003 | Sato | G08G 1/165 382/104 |
| 2007/0127778 A1* | 6/2007 | Fujimoto | G06T 7/246 382/104 |

(Continued)

FOREIGN PATENT DOCUMENTS

| JP | 2017-151815 A | 8/2017 |
| JP | 2017-156988 A | 9/2017 |
| JP | 2019-089636 A | 6/2019 |

OTHER PUBLICATIONS

Evaluation of an Intelligent Collision Warning System for Forklift Truck Drivers in Industry (Year: 2018).*

(Continued)

*Primary Examiner* — Nizar N Sivji
(74) *Attorney, Agent, or Firm* — Sughrue Mion, PLLC

(57) ABSTRACT

An object detection device configured to be mounted on a vehicle includes an object extraction unit that is configured to extract a point group that is a set of points representing a part of an object as the object, a neighboring object extraction unit that is configured to extract a neighboring object in an XY-plane of a world coordinate system, wherein the neighboring object is the object which is the closest to the vehicle, a coordinate transformation unit that is configured to transform coordinates of the neighboring object in the world coordinate system into coordinates of the neighboring object in an image captured by a camera, and a person determination unit that is configured to perform a person detection process in which it is determined whether or not the neighboring object is a person on the coordinates of the neighboring object.

10 Claims, 6 Drawing Sheets

(51) Int. Cl.
*G06K 9/62* (2022.01)
*G06V 10/46* (2022.01)
*G06V 20/58* (2022.01)
*G06V 40/10* (2022.01)

(52) U.S. Cl.
CPC ............ *G06V 10/462* (2022.01); *G06V 20/58* (2022.01); *G06V 40/10* (2022.01); *G06T 2207/30196* (2013.01); *G06T 2207/30261* (2013.01)

(58) Field of Classification Search
CPC ............... G06K 9/4671; G06K 9/6276; G06K 9/00369; G06K 9/00791; G06T 7/73; G06T 7/70; G06T 2207/30196; G06T 2207/30261; B66F 9/0755; B60Y 2200/15; G01C 11/00; G01C 11/02; G01B 11/002; G01S 5/16
See application file for complete search history.

(56) References Cited

U.S. PATENT DOCUMENTS

| | | | | |
|---|---|---|---|---|
| 2007/0274566 | A1* | 11/2007 | Fujimoto | G06K 9/00798 382/103 |
| 2008/0253606 | A1* | 10/2008 | Fujimaki | G06T 7/85 382/100 |
| 2013/0177205 | A1* | 7/2013 | Kasaoki | G06K 9/00369 382/103 |
| 2019/0080476 | A1* | 3/2019 | Ermilios | G06T 7/80 |
| 2020/0311964 | A1* | 10/2020 | Ishizaki | G06K 9/00805 |

OTHER PUBLICATIONS

Extended European Search Report dated Feb. 17, 2021 in European Application No. 20198950.6.

\* cited by examiner

OBJECT DETECTION DEVICE, VEHICLE, AND OBJECT DETECTION PROCESS

CROSS-REFERENCE TO RELATED APPLICATION

This application claims priority to Japanese Patent Application No. 2019-183767 filed on Oct. 4, 2019, the entire disclosure of which is incorporated herein by reference.

BACKGROUND ART

The present disclosure relates to an object detection device, to a vehicle on which an object detection device is mounted, and to an object detection process performed by an object detection device.

An object detection device for detecting objects such as people and obstacles is mounted in vehicles. The object detection device described in Japanese Patent Application Publication No. 2017-151815 divides an image captured by an imaging device into a plurality of areas, and extracts an identification processing target image for each of the areas. The object detection device performs a person detection process on the identification processing target images. Extraction of the identification processing target images is performed by using a brightness gradient and Hough transform.

In the Publication, the area in which the person detection process is performed is large, so that a processing load of the object detection device is large.

The present disclosure is directed to providing an object detection device having a small processing load.

SUMMARY

In accordance with an aspect of the present disclosure, there is provided an object detection device configured to be mounted on a vehicle. The object detection device includes an object extraction unit that is configured to extract a point group that is a set of points representing a part of an object as the object in a world coordinate system in a real space, wherein an X-axis extends in a vehicle width direction of the vehicle in a horizontal direction and a Y-axis extends orthogonal to the X-axis in the horizontal direction, a neighboring object extraction unit that is configured to extract a neighboring object in an XY-plane of the world coordinate system, wherein the XY-plain is partitioned in such a manner that a first block whose dimension along the Y-axis is larger than that along the X-axis is located in a front area and second blocks whose dimensions along the Y-axis each are smaller than that along the X-axis are arranged in a direction in which the Y-axis extends and located in turning areas, the front area facing the vehicle in the direction in which the Y-axis extends, the turning areas being adjacent to the front area in a direction in which the X-axis extends, and wherein the neighboring object is the object which is the closest to the vehicle of the objects that are present in each of the first block and the second blocks for each of the first block and the second blocks, a coordinate transformation unit that is configured to transform coordinates of the neighboring object in the world coordinate system into coordinates of the neighboring object in an image captured by a camera, and a person determination unit that is configured to perform a person detection process in which it is determined whether or not the neighboring object is a person on the coordinates of the neighboring object.

In accordance with an aspect of the present disclosure, there is provided a vehicle on which the object detection device is mounted.

In accordance with an aspect of the present disclosure, there is provided an object detection process performed by the object detection device mounted on the vehicle. The process includes extracting, by an object extraction unit of the object detection device, a point group that is a set of points representing a part of an object as the object in a world coordinate system in a real space, wherein an X-axis extends in a vehicle width direction of the vehicle in a horizontal direction and a Y-axis extends orthogonal to the X-axis in the horizontal direction, extracting, by a neighboring object extraction unit of the object detection device, a neighboring object in an XY-plane of the world coordinate system, the XY-plane being partitioned in such a manner that a first block whose dimension along the Y-axis is larger than that along the X-axis is located in a front area and second blocks whose dimensions along the Y-axis each are smaller than that along the X-axis are arranged in a direction in which the Y-axis extends and located in turning areas, the front area facing the vehicle in the direction in which the Y-axis extends, the turning areas being adjacent to the front area in a direction in which the X-axis extends, wherein the neighboring object is the object which is the closest to the vehicle of the objects that are present in each of the first block and the second blocks for each of the first block and the second blocks, transforming, by a coordinate transformation unit of the object detection device, coordinates of the neighboring object in the world coordinate system into coordinates of the neighboring object in an image captured by a camera, and performing, by a person determination unit of the object detection device, a person detection process in which it is determined whether or not the neighboring object is a person on the coordinates of the neighboring object.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

The following will describe an embodiment of an object detection device according to the present disclosure.

Figure 1:
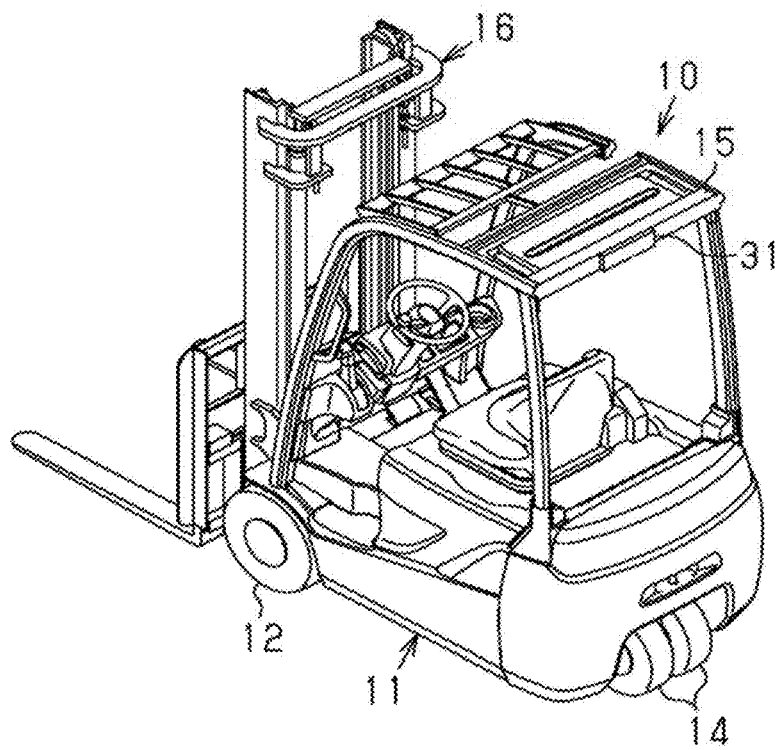
FIG. 1 is a perspective view of a forklift on which an object detection device is mounted according to the present disclosure.

Referring to FIG. 1, a forklift 10 as a vehicle includes a vehicle body 11, driving wheels 12 that are disposed in a front lower portion of the vehicle body 11, steering wheels 14 that are disposed in a rear lower portion of the vehicle body 11, and a cargo handling apparatus 16. The vehicle body 11 has an overhead guard 15 that is provided on an upper portion of a driver's seat. The forklift 10 according to the present embodiment performs a traveling operation and a cargo handling operation by an operation of a driver.

Figure 2:
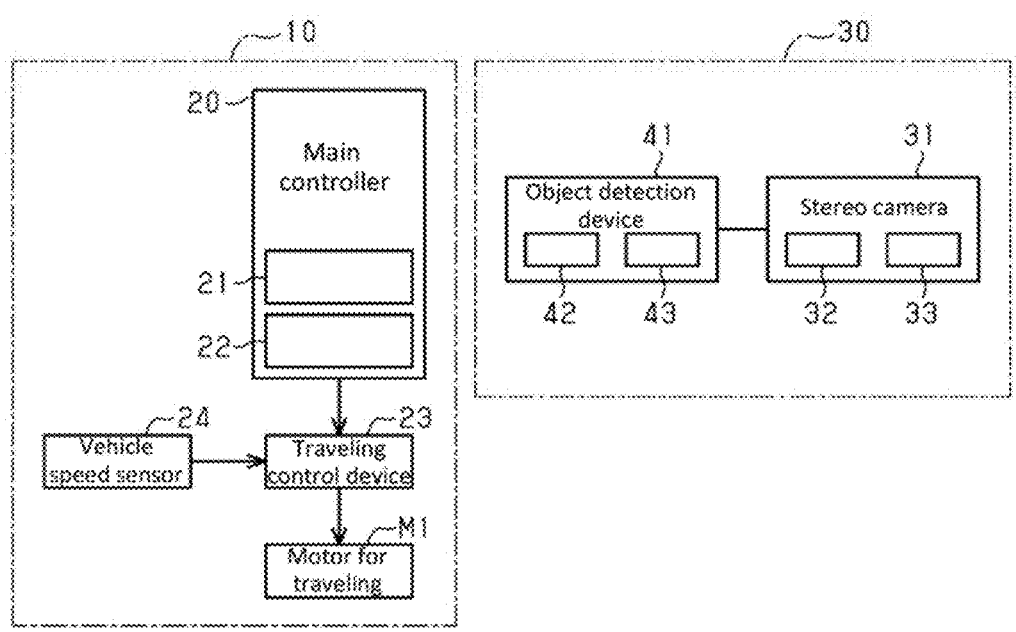
FIG. 2 is a schematic configuration view of the forklift and a monitoring device of FIG. 1.

Referring to FIG. 2, the forklift 10 includes a main controller 20, a motor for traveling M1, a traveling control device 23 that controls the motor for traveling M1, and a vehicle speed sensor 24. The main controller 20 performs controls in relation to the traveling operation and the cargo handling operation. The main controller 20 has a CPU 21 and a memory 22 storing programs for performing various controls, and the like. The main controller 20 may have a dedicated hardware that performs at least a part of various processes, that is, an application specific integrated circuit: ASIC. The main controller 20 which is a processing circuit may include one or more processors that are operated in accordance with the programs, one or more dedicated hardware circuits such as ASIC, or a combination of the processors and the dedicated hardware circuits. The processors each include a CPU and a memory such as a RAM and a ROM. The memory stores program codes or commands by which the CPU executes processes. The memory, that is, a computer-readable medium includes any usable medium that is allowed to be accessed by a general-purpose computer and a dedicated computer.

The CPU 21 of the main controller 20 gives a command value of rotational speed of the motor for traveling M1 to the traveling control device 23 in such a manner that a vehicle speed of the forklift 10 reaches a target vehicle speed. The traveling control device 23 of the present embodiment is a motor driver. The vehicle speed sensor 24 according to the present embodiment is a rotational speed sensor that detects the rotational speed of the motor for traveling M1. The vehicle speed sensor 24 outputs the rotational speed of the motor for traveling M1 to the traveling control device 23. The traveling control device 23 controls the motor for traveling M1 in accordance with the command from the main controller 20 in such a manner that the rotational speed of the motor for traveling M1 coincides with the command value.

A monitoring device 30 is mounted on the forklift 10. The monitoring device 30 has a stereo camera 31 as the camera, an object detection device 41 that detects objects from images captured by the stereo camera 31. The stereo camera 31 is disposed so as to capture an aerial view image of a road surface on which the forklift 10 travels, from an upper side of the forklift 10. The stereo camera 31 of the present embodiment captures a rear side of the forklift 10. Accordingly, the objects detected by the object detection device 41 are located on the rear side of the forklift 10. As illustrated in FIG. 1, the stereo camera 31 is disposed on, for example, the overhead guard 15.

Referring to FIG. 2, the stereo camera 31 has the first camera 32 and the second camera 33. A CCD image sensor and a CMOS image sensor are used as the first camera 32 and the second camera 33. The first camera 32 and the second camera 33 are disposed in such a manner that optical axes of the first camera 32 and the second camera 33 are in parallel with each other. In the present embodiment, the first camera 32 and the second camera 33 are horizontally arranged in a line. When an image captured by the first camera 32 is defined as a first image and an image captured by the second camera 33 as a second image, an object captured in the first image is shifted in a transverse direction of the forklift 10 relative to the same object captured in the second image. In detail, when the same object is captured by the first camera 32 and the second camera 33, a shift of pixels [px] in the transverse direction is generated in accordance with a distance between the first camera 32 and the second camera 33 in the object captured in the first image and the same object captured in the second image. The first image and the second image have the same pixel counts. For example, an image of VGA with 640×480 [px] resolutions is used as the first image and the second image. The first image and the second image are images which are expressed by RGB signals.

The object detection device 41 includes a CPU 42 and a memory 43 that including a RAM, a ROM, and the like. Various programs for detecting objects from images captured by the stereo camera 31 are stored in the memory 43. The object detection device 41 may have a dedicated hardware that performs at least a part of various processes, that is, an application specific integrated circuit: ASIC. The object detection device 41 which is a processing circuit may include one or more processors that are operated in accordance with the programs, one or more dedicated hardware circuits such as ASIC, or a combination of the processors and the dedicated hardware circuits. The processors each include a CPU and a memory such as a RAM and a ROM. The memory stores program codes or commands by which the CPU executes processes. The memory, that is, a computer-readable medium includes any medium that is allowed to be accessed by a general-purpose computer and a dedicated computer.

The following will describe an object detection process performed by the object detection device 41. The object detection process is repeated every specified control period, for example, while the forklift 10 is in a starting state and travels rearward. The starting state herein means the state in which the forklift 10 is allowed to perform the traveling operation and the cargo handling operation.

Figure 3:
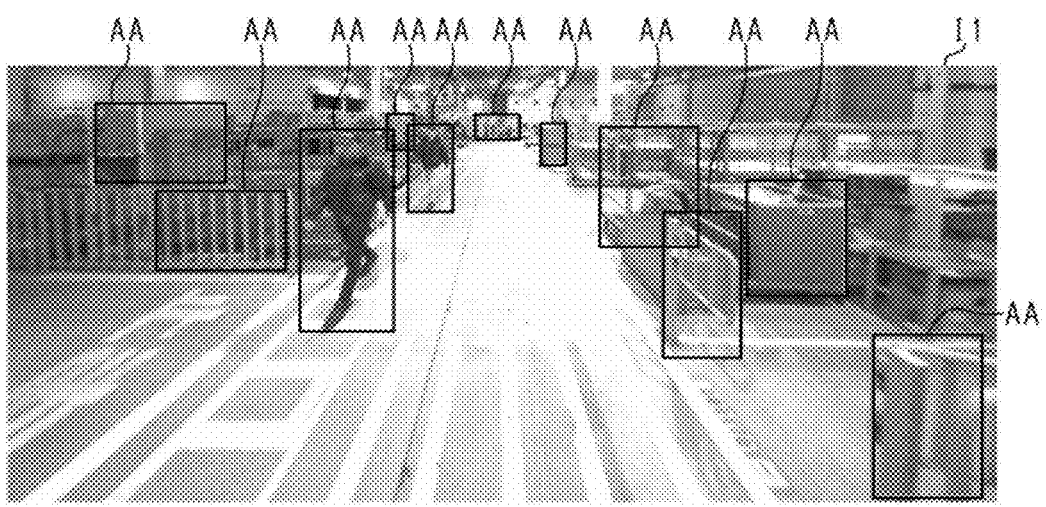
FIG. 3 is a view showing a first image according to the present disclosure.

The following will describe the object detection process in a case where an environment shown in FIG. 3 is captured by the stereo camera 31, as an example. FIG. 3 is a first image I1 obtained by capturing the rear side of the forklift 10. As can be seen from the first image I1, people and objects other than the people are present on the rear side of the forklift 10. It is noted that coordinates of the objects in the first image I1 are indicated by windows AA for the ease of explanation, but the windows AA do not actually exist in the first image I1.

Figure 4:
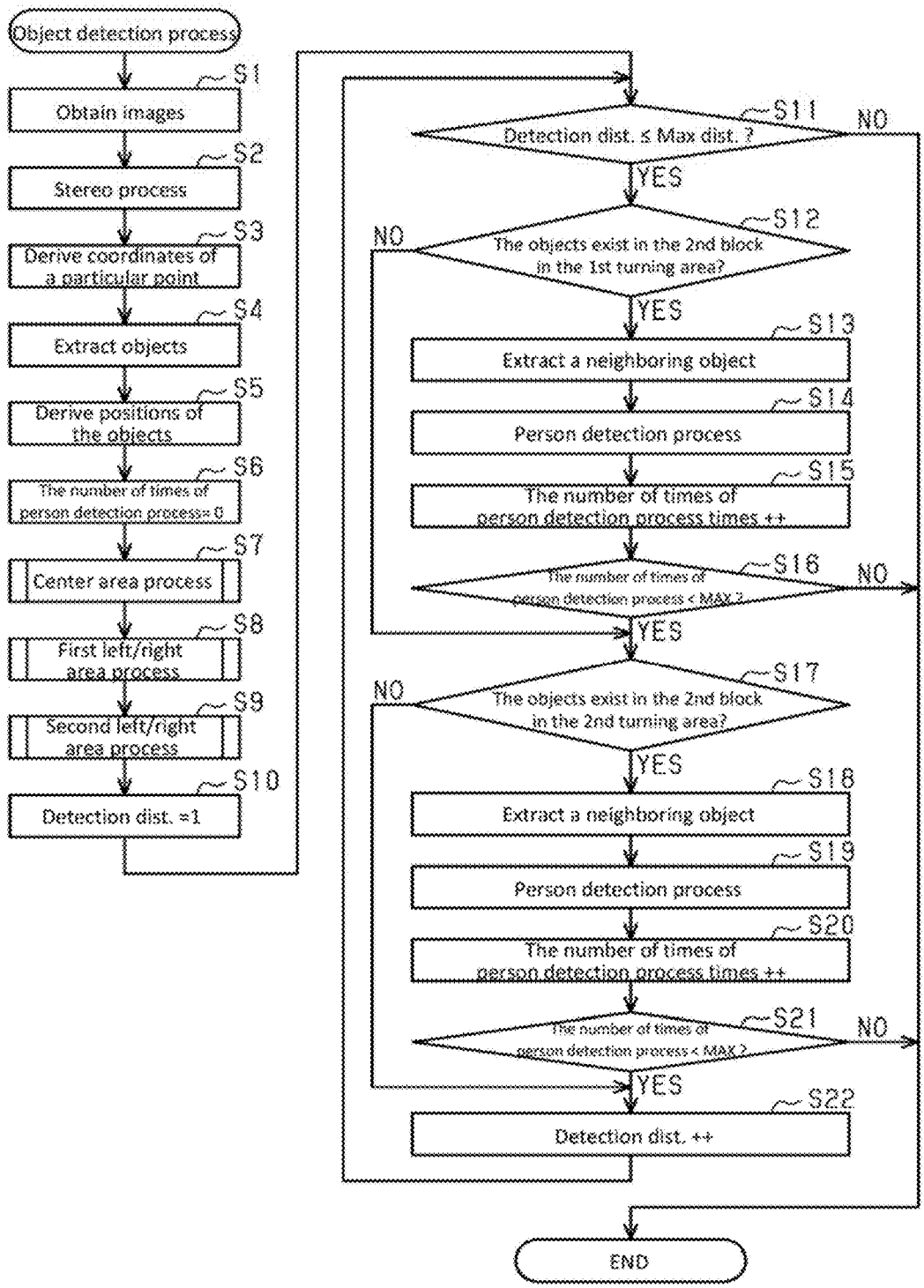
FIG. 4 is a flowchart showing an object detection process performed by the object detection device of FIG. 2.

As illustrated in FIG. 4, at Step S1, the object detection device 41 obtains the first image I1 and the second image of the same frame from a video captured by the stereo camera 31.

Next, at Step S2, the object detection device 41 obtains a disparity image by a stereo process. The disparity image means an image whose pixels are correlated with a disparity [px]. The disparity is obtained by comparing the first image I1 with the second image, and calculating a difference of the pixel counts between the first image I1 and the second image at the same particular point captured in each of the first image I1 and the second image. It is noted that the particular point means a visually recognizable point as a border, such as an edge of an object. The particular point may be detected from information of brightness, and the like.

The object detection device 41 converts a color space of an image data from RGB to YCrCb by using a RAM which temporarily stores the images. It is noted that the object detection device 41 may perform a distortion correction, an edge enhancement process, and the like. The object detection device 41 performs a stereo process in which the disparity is calculated by comparing similarities between the pixels of the first image I1 and the pixels of the second image. It is noted that a method that calculates the disparity for each pixel or a block matching method that divides each image into blocks including a plurality of pixels and calculates the disparity for each block may be used as the stereo process. The object detection device 41 uses the first image I1 as a base image and the second image as a comparison image to obtain the disparity image. The object detection device 41 extracts a pixel of the second image that is most similar to a pixel of the first image I1 for each pixel of the first image I1, and calculates a difference of the pixel counts in the transverse direction of the forklift 10 between the pixel of the first image I1 and the pixel of the second image that is most similar to the pixel of the first image I1 as the disparity. Thus, the disparity image in which the disparity is correlated with each pixel of the first image I1 being the base image may be obtained. The disparity image is not necessarily a visualized data, and means a data in which the disparity is correlated with each pixel of the disparity image. It is noted that the object detection device 41 may perform a process in which a disparity of a road surface is removed from the disparity image. The object detection device 41 serves as a disparity image acquisition unit at Step S2. The disparity image acquisition unit acquires the disparity image whose pixels are correlated with the disparity from the first image I1 and the second image captured by the stereo camera 31.

Then, at Step S3, the object detection device 41 derives coordinates of the particular point in a world coordinate system. Firstly, the object detection device 41 derives coordinates of the particular point in a camera coordinate system. The camera coordinate system is a three-axis orthogonal coordinate system in which an optical axis of a camera equals to a Z-axis, and each of two axes orthogonal to the optical axis equals to an X-axis and Y-axis. The coordinates of the particular point in the camera coordinate system are represented by a Z-coordinate Zc, an X-coordinate Xc, and a Y-coordinate Yc. The Z-coordinate Zc, X-coordinate Xc, and Y-coordinate Yc are derived by the following Equations 1 to 3.

[Equation 1]

$$Z_C = \frac{B \times f}{d} \quad (1)$$

[Equation 2]

$$X_C = (xp - x') \times \frac{Z_C}{f} \quad (2)$$

[Equation 3]

$$Y_C = (yp - y') \times \frac{Z_C}{f} \quad (3)$$

In Equations 1 to 3, B is a base line length [mm], f is a focal length [mm], and d is a disparity [px]. An arbitrary X-coordinate in the disparity image is represented by xp, and an X-coordinate of center coordinates of the disparity image is represented by x'. An arbitrary Y-coordinate in the disparity image is represented by yp, and a Y-coordinate of the center coordinates of the disparity image is represented by y'.

The coordinates of the particular point in the camera coordinate system are derived by Equations 1 to 3, wherein xp and yp are respectively the X-coordinate and the Y-coordinate of the particular point in the disparity image, and d is the disparity correlated with the coordinates of the particular point.

Here, the three-axis orthogonal coordinate system in which an X-axis extends in a vehicle width direction of the forklift 10 in the horizontal direction, a Y-axis extends orthogonal to the X-axis in the horizontal direction, and a Z-axis extends orthogonal to the X-axis and the Y-axis, is defined as the world coordinate system which is a three-axis orthogonal coordinate system in a real space. The Y-axis in the world coordinate system is also defined as the axis that extends in a front and rear direction of the forklift 10, that is, in a traveling direction of the forklift 10. The Z-axis in the world coordinate system is also defined as the axis that extends in the vertical direction. The coordinates of the particular point in the word coordinate system are represented by an X-coordinate Xw, a Y-coordinate Yw, and a Z-coordinate Zw in the world coordinate system.

The object detection device 41 performs a world coordinate transformation from the camera coordinate system to the world coordinate system by the following Equation 4.

[Equation 4]

$$\begin{pmatrix} X_W \\ Y_W \\ Z_W \end{pmatrix} = \begin{pmatrix} 1 & 0 & 0 \\ 0 & \cos\theta & -\sin\theta \\ 0 & \sin\theta & \cos\theta \end{pmatrix} \begin{pmatrix} X_C \\ Y_C \\ Z_C \end{pmatrix} + \begin{pmatrix} 0 \\ 0 \\ H \end{pmatrix} \quad (4)$$

In the above Equation 4, H is an installation height [mm] of the stereo camera 31, θ is an angle of +90° between the optical axes of the first camera 32 and the second camera 33, and a horizontal surface.

The X-coordinate Xw of the world coordinates obtained by the world coordinate transformation represents a distance from the forklift 10 to the particular point in the vehicle width direction of the forklift 10. The Y-coordinate Yw represents a distance from the forklift 10 to the particular point in the traveling direction of the forklift 10. The Z-coordinate Zw represents a height from the road surface to the particular point. The particular point is the point that represents a part of the object. The object detection device 41 serves as a coordinate derivation unit at Step S3. The coordinate derivation unit derives the coordinates of the particular point in the world coordinate system from the disparity image.

Then, at Step S4, the object detection device 41 extracts objects that are present in the world coordinate system. The object detection device 41 defines a set of particular points of a plurality of particular points that represent a part of the object as one point group, and extracts the point group as the object. It is assumed that each of the particular points represents the same object. For example, the object detection device 41 performs clustering. The clustering recognizes the particular points positioned in a specified range by the world coordinates of the particular points derived at Step S3 as one point group. The object detection device 41 recognizes the clustered point group as one object. It is noted that the clustering of the particular points at Step S4 may be performed by various methods. The object detection device 41 serves as an object extraction unit that extracts the objects that are present in the world coordinate system at Steps S1 to S4. The object extraction unit includes the disparity image acquisition unit and the coordinate derivation unit.

Figure 6:
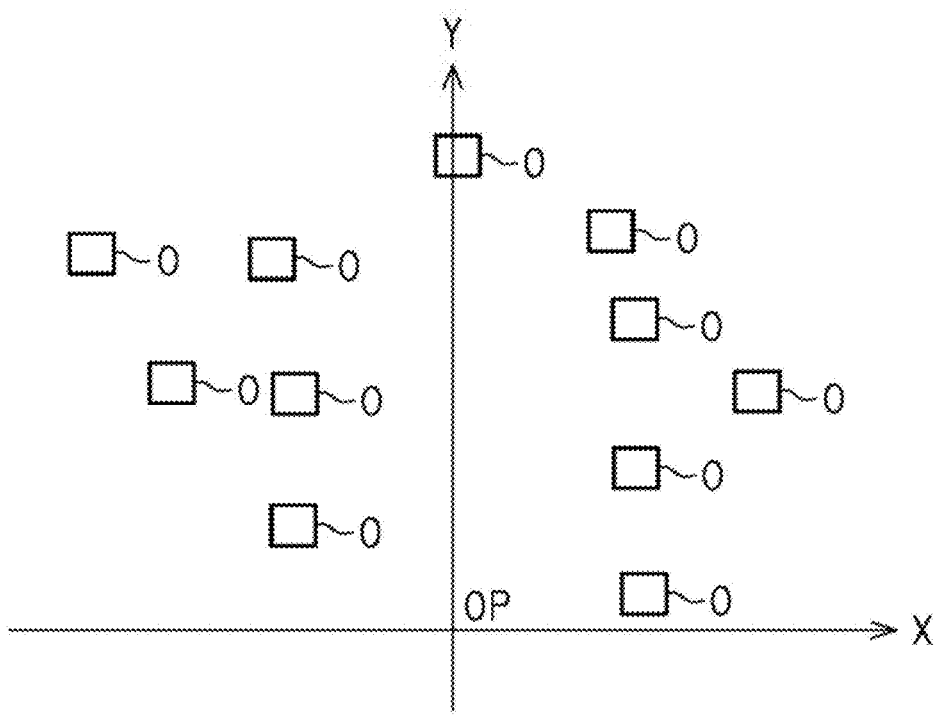
FIG. 6 is a view showing positions of objects in an XY-plane.

Then, at Step S5, the object detection device 41 derives positions of the objects extracted at Step S4. It is noted that the position of each objects means the coordinates of the object in an XY-plane in the world coordinate system. When Step S5 is executed, coordinates of objects O in the XY-plane in the world coordinate system are derived, as illustrated in FIG. 6. The object detection device 41 recognizes the world coordinates of one object O by the world coordinates of the particular points constituting the clustered point group. For example, the object detection device 41 may define the X-coordinates Xw, the Y-coordinates Yw, and the Z-coordinates Zw of the plurality of particular points positioned in an end of the clustered point group as the X-coordinates Xw, the Y-coordinates Yw, and the Z-coordinates Zw of the object O, and define the X-coordinate Xw, the Y-coordinate Yw, and the Z-coordinate Zw of the particular point that is a center of the point group as the X-coordinate Xw, Y-coordinate Yw, and the Z-coordinate Zw of the object O. That is, the coordinates of the object O in the world coordinate system may represent the whole object O, or a point of the object O.

As illustrated in FIG. 6, the object detection device 41 projects the X-coordinates Xw, the Y-coordinates Yw, and the Z-coordinate Zw of the objects O on the XY-plane of the world coordinate system, thereby deriving the X-coordinates Xw and the Y-coordinates Yw of the objects O in the XY-plane of the world coordinate system. That is, the object detection device 41 removes the Z-coordinates Zw from the X-coordinates Xw, the Y-coordinates Yw, and the Z-coordinates Zw of the objects O, thereby deriving the X-coordinates Xw and the Y-coordinates Yw of the objects O in the horizontal direction. It is noted that a middle point of the forklift 10 in the width direction of the forklift 10 that is located at a rear end of the forklift 10 is defined as an origin OP in the world coordinate system of the present embodiment.

Next, as illustrated in FIG. 4, at Step S6, the object detection device 41 resets the number of times of a person detection process to zero. The number of times of the person detection process means the number of times in which the person detection process is performed in one control period, in other word, the number of target objects O on which the person detection process is performed.

The object detection device 41 detects people in the XY-plane that represents a horizontal surface of the world coordinate system at Step S7 and subsequent steps. The object detection device 41 detects the people that are present in the XY-plane by performing the person detection process in which it is determined whether or not the objects O extracted at Step S4 are people. In the present embodiment, a detection area in which the people are detected in the XY-plane of the world coordinate system is defined. The object detection device 41 detects the people that are present in the detection area. It is noted that a direction in which the X-axis of the world coordinate system extends is defined as an X-direction and a direction in which the Y-axis of the world coordinate system extends is defined as a Y-direction in the following description.

Figure 7:
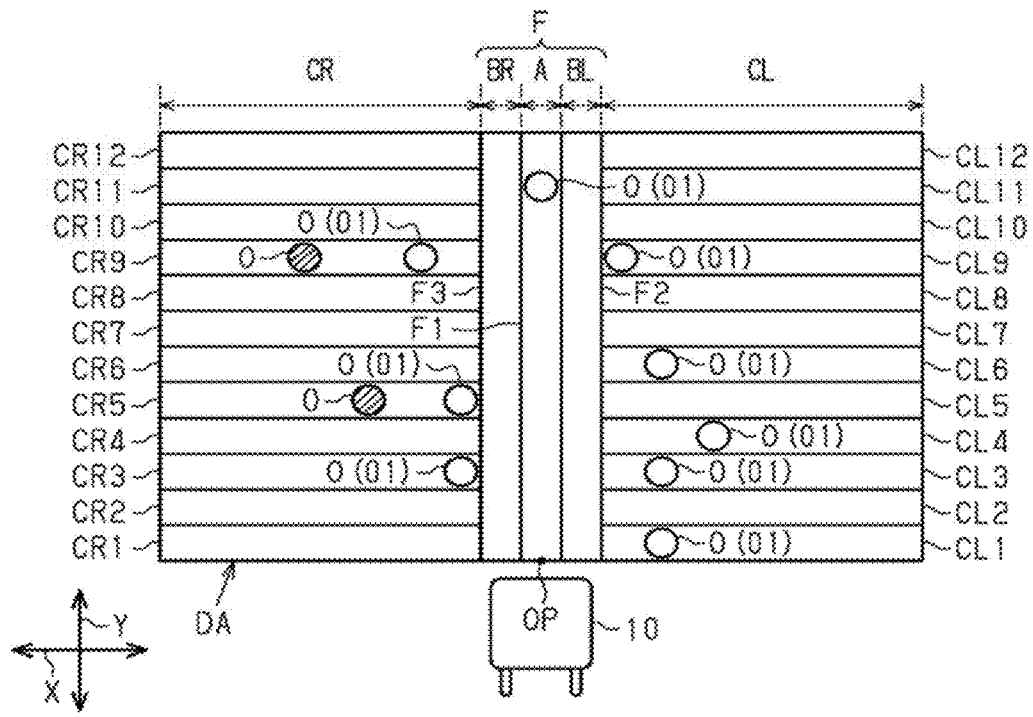
FIG. 7 is a view schematically showing the XY-plane divided into a plurality of blocks.

As illustrated in FIG. 7, a detection area DA of the present embodiment is a rectangular area that spreads rearward of the forklift 10. It is noted that as described above, although the origin OP of the world coordinate system is located in the rear end of the forklift 10, the origin OP is illustrated in such a manner that the origin OP is separated from the forklift 10 in the Y-direction in FIG. 7 for the ease of explanation. A middle point of the detection area DA in the X-direction is the same as a middle point of the forklift 10 in the X-direction. Dimensions of the detection area DA in the X-direction and the Y-direction may be set to an arbitrary value in a range in which the people are detectable by the monitoring device 30. The dimension of the detection area DA in the X-direction specifies the range in which people are detected in the left and right direction, that is, in the turning direction of the forklift 10. Adjustment of the dimension of the detection area DA in the X-direction determines the range in which people are detectable in the left and right direction of the forklift 10. The dimension of the detection area DA in the Y-direction specifies the range in which people are detected on the rear side of the forklift 10, that is, in the traveling direction of the forklift 10. Adjustment of the dimension of the detection area DA in the Y-direction determines the range in which people are detectable on the rear side of the forklift 10.

The detection area DA is divided into a front area F and turning areas CR and CL.

The front area F is an area that is located in front of the forklift 10 in the traveling direction of the forklift 10. That is, the front area F faces the forklift 10 in the Y-direction. The front area F is an area through which at least a part of the forklift 10 passes when the forklift 10 travels straight rearward. The front area F includes a center area A and two left/right areas BR and BL. The center area A faces, in the Y-direction, the middle point of the forklift 10 of the X-direction. That is, the center area A faces the forklift 10 in the Y-direction across the entire dimension of the center area A in the X-direction. The left/right areas BR and BL face each other across the center area A. That is, the two left/right areas BR and BL each are an area adjacent to the center area A in the X-direction. A part of the left/right area BR and BL in the X-direction faces the forklift 10 in the Y-direction. Hereinafter, one of the two left/right areas BR and BL is called a first left/right area BR, and the other is called a second left/right area BL as appropriate. The first left/right area BR is defined as a left/right area that is located on a right side of the forklift 10, and the second left/right area BL is defined as the left/right area that is located on a left side of the forklift 10.

The turning areas CR and CL are different from the front area F. The turning areas CR and CL do not face the forklift 10 in the Y-direction. The turning areas CR and CL are an area through which the forklift 10 passes when the forklift 10 turns while the forklift 10 travels rearward. In other word, the turning areas CR and CL are an area through which the forklift 10 does not pass when the forklift 10 travels straight rearward. The two turning areas CR and CL face each other across the front area F. The two turning areas CR and CL each are an area adjacent to the front area F in the X-direction. Hereinafter, one of two turning areas CR and CL is called a first turning area CR, and the other is called a second turning area CL, as appropriate. The first turning area CR is defined as a turning area that is located on the right side of the forklift 10, and the second turning area CL is defined as the turning area that is located on the left side of the forklift 10.

The detection area DA in the XY-plane of the world coordinate system is partitioned into a plurality of blocks F1 to F3, CR1 to CR12, and CL1 to CL12.

The front area F is divided into the X-direction and partitioned into three first blocks F1 to F3. That is, the first blocks F1 to F3 are disposed correspondingly to the center area A, the first left/right area BR, and the second left/right area BL, respectively. All the first blocks F1 to F3 have the same size. Each of the first blocks F1 to F3 is a rectangular area whose dimension along the Y-axis of the world coordinate system is larger than that along the X-axis of the world coordinate system. The dimension of the first blocks F1 to F3 along the X-axis may be selected to an arbitrary value. The dimension of the first blocks F1 to F3 along the X-axis in the present embodiment is set for detecting people, and is set to, for example, a slightly larger dimension than a width of a human body. The dimension of the first blocks F1 to F3 along the X-axis is set to, for example, 400 [mm] to 1500 [mm]. A dimension of the first blocks F1 to F3 along the Y-axis may be set to an arbitrary value. In the present embodiment, the dimension of the first blocks F1 to F3 along the Y-axis is the same as the dimension of the detection area DA in the Y-direction.

The two turning areas CR and CL are divided into a plurality of second blocks CR1 to CR12, and CL1 to and CL12 in the Y-direction, respectively. The first turning area CR is divided into twelve second blocks CR1 to CR12. The second turning area CL is divided into twelve second blocks CL1 to CL12. All the second blocks CR1 to CR12, and CL1 to CL12 have the same size. Each of the second blocks CR1 to CR12, and CL1 to CL12 is a rectangular area whose dimension along the Y-axis of the world coordinate system is smaller than that along the X-axis of the world coordinate system. A dimension of the second blocks CR1 to CR12, and CL1 to CL12 along the X-axis may be set to an arbitrary value. In the present embodiment, the dimension of the second blocks CR1 to CR12, and CL1 to CL12 along the X-axis is the same as a dimension of the turning areas CR and CL along the X-axis. A dimension of the second blocks CR1 to CR12, and CL1 to CL12 along the Y-axis may be set to an arbitrary value. The dimension of the second blocks CR1 to CR12, and CL1 to CL12 along the Y-axis in the present embodiment is set for detecting people, and is set to, for example, a slightly larger dimension than a width of a human body. The dimension of the second blocks CR1 to CR12, and CL1 to CL12 along the Y-axis is set to, for example, 400 [mm] to 1500 [mm].

The detection area DA is divided in either of the X-direction or the Y-direction in accordance with a positional relationship with the forklift 10. The detection area DA in the XY-plane is partitioned in such a manner that the first blocks F1 to F3 are located in the front area F, and the second blocks CR1 to CR12, and CL1 to CL12 are arranged in the Y-direction and located in the turning areas CR and CL. The objects O are projected on the XY-plane of the world coordinate system divided as described above, so that the object detection device 41 may recognize in which block of the blocks F1 to F3, CR1 to CR12, and CL1 to CL12 the objects O are present. It is noted that in a case where one object O extends over some adjacent blocks of a plurality of the blocks F1 to F3, CR1 to CR12, and CL1 to CL12, the object detection device 41 may determine in which block of the blocks F1 to F3, CR1 to CR12, and CL1 to CL12 the object O is present by the center coordinates of the object O. In addition, in the above case, the object detection device 41 may determine that the object O is present in the plurality of blocks of the blocks F1 to F3, CR1 to CR12, and CL1 to CL12. Thus, the determination of in which block of the blocks F1 to F3, CR1 to CR12, and CL1 to CL12 an object O is present is performed by an arbitrary method.

The object detection device 41 determines whether or not people are present in each of the blocks F1 to F3, CR1 to CR12, and CL1 to CL12 partitioned as described above at Step S7 and the subsequent steps illustrated in FIG. 4.

As illustrated in FIG. 4, at Step S7, the object detection device 41 proceeds to a center area process in which determination of whether or not people are present in the center area A of the front area F is performed. When proceeding to the center area process, the object detection device 41 executes steps S31 to S34 illustrated in FIG. 5.

Figure 5:
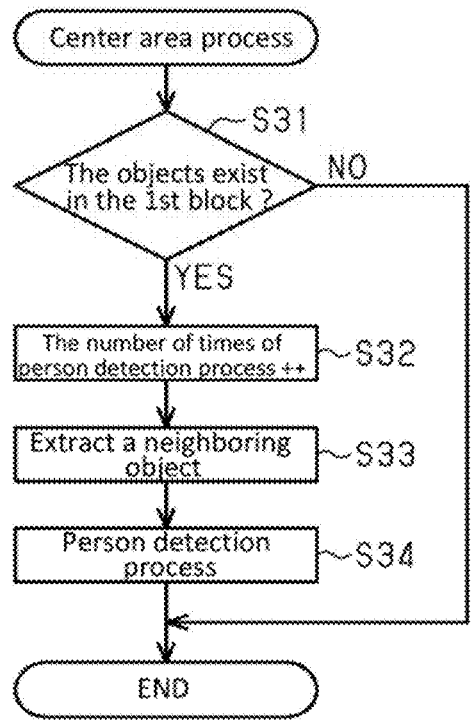
FIG. 5 is a flowchart showing a center area process of FIG. 4.

As illustrated in FIG. 5, at Step S31, the object detection device 41 determines whether or not an object O is present in the first block F1 of the center area A. When a determination result is YES at Step S31 (YES at S31), the object detection device 41 executes Step S32. On the other hand, when the determination result is NO at Step S31 (NO at S31), the object detection device 41 ends the center area process.

At Step S32, the object detection device 41 performs an increment process in which 1 is added to the number of times of the person detection process.

Next, at Step S33, the object detection device 41 defines the object O which is the closest to the forklift 10 of the objects O that are present in the first block F1 as a neighboring object O1, and extracts the neighboring object O1. When a single object O is present in the first block F1, the single object O is defined as the object O which is the closest to the forklift 10. When a plurality of objects O are present in the first block F1, the object O whose Y-coordinate Yw is the closest to zero (the object O that is located closest to the origin OP) of the plurality of objects O is defined as the object O which is the closest to the forklift 10. It is noted that the object O which is the closest to the forklift 10 of the plurality of objects O may be defined as the object O which has the shortest Euclidean distance from the origin OP. The neighboring object O1 means an object on which the person detection process is performed prior to the objects O which is not the neighboring object O1.

Next, at Step S34, the object detection device 41 performs the person detection process in which it is determined whether or not the neighboring object O1 is a person. The determination of whether or not the neighboring object O1 is the person is performed by the following processes. Firstly, the object detection device 41 transforms world coordinates of the neighboring object O1 into camera coordinates of the neighboring object O1. The transformation from the world coordinate system to the camera coordinate system is performed by using the following Equation 5.

[Equation 5]

$$\begin{pmatrix} X_C \\ Y_C \\ Z_C \end{pmatrix} = \begin{pmatrix} 1 & 0 & 0 \\ 0 & \cos\theta & -\sin\theta \\ 0 & \sin\theta & \cos\theta \end{pmatrix}^{-1} \left( \begin{pmatrix} X_W \\ Y_W \\ Z_W \end{pmatrix} - \begin{pmatrix} 0 \\ 0 \\ H \end{pmatrix} \right) \quad (5)$$

The camera coordinates of the neighboring object O1 are derived by Equation 5, when the X-coordinate Xw, the Y-coordinate Yw, and the Z-coordinate Zw are the world coordinates of the neighboring object O1. It is noted that in the present embodiment, because the world coordinates of the neighboring object O1 are represented as the coordinates in the XY-plane, the Z-coordinate Zw is zero.

Next, the object detection device 41 derives coordinates of the neighboring object O1 in the first image I1 from the camera coordinates of the neighboring object O1 by using the following Equations 6 and 7.

[Equation 6]

$$xp = X_C \times \frac{f}{Z_C} + x' \quad (6)$$

[Equation 7]

$$yp = y' - Y_C \times \frac{f}{Z_C} \quad (7)$$

The coordinates of the neighboring object O1 in the first image I1 are derived by Equations 6 and 7, when the X-coordinate Xc, Y-coordinate Yc, and Z-coordinate Zc are the camera coordinates of the neighboring object O1.

The object detection device 41 determines whether or not the neighboring object O1 is a person by performing the person detection process on the coordinates of the neighboring object O1 in the first image I1. It is noted that the coordinates of the neighboring object O1 in the first image I1 may include coordinates around the coordinates derived by Equations 6 and 7 as well as the coordinates derived by Equations 6 and 7. The person detection process is performed by a feature extraction method that extracts features from the first image I1, for example, HOG: Histograms of Oriented Gradients and SIFT: Scale Invariant Feature Transform. With this method, the object detection device 41 determines whether the neighboring object O1 is a person or the object O except for the person. It is noted that because a positional relationship between the forklift 10 and the neighboring object O1 is derived at Step S5, the object detection device 41 may obtain the positional relationship between the forklift 10 and the neighboring object O1. As described above, the object detection device 41 determines whether or not people are present in the center area A by executing Steps S31 to S34.

As illustrated in FIG. 4, at Step S8, the object detection device 41 proceeds to the first left/right area process in which a determination of whether or not people are present in the first left/right area BR is performed. The first left/right area process at Step S8 may be performed by the same process as the center area process. In detail, the process performed on the first block F1 of the center area A in the center area process only needs to be performed on the first block F3 of the first left/right area BR. Thus, the object detection device 41 determines whether or not people are present in the first left/right area BR.

Next, at Step S9, the object detection device 41 proceeds to a second left/right area process that determines whether or not people are present in the second left/right area BL. The second left/right area process at Step S9 may be performed by the same process as the center area process. In detail, the process performed on the first block F1 of the center area A in the center area process only needs to be performed on the first block F2 of the second left/right area BL. Thus, the object detection device 41 determines whether or not people are present in the second left/right area BL.

Next, at Step S10, the object detection device 41 resets a detection distance to one. The detection distance specifies a processing target block of the plurality of second blocks CR1 to CR12, and CL1 to CL 12. The plurality of the second blocks CR1 to CR12, and CL1 to CL12 are numbered in order from the second blocks which are the closest to the forklift 10 in such a manner that the second blocks CR1 and CL1 which are the closest to the forklift 10 have the first number, the blocks CR2 and CL2 which are the second closest to the forklift 10 have the second number, and the like. In this case, any of second blocks CR1 to CR12, and CL1 to CL12 corresponding to the detection distance is the target block at Step S12 and subsequent steps. For example, when the detection distance is 1, the second blocks CR1 and CL1 which are the closest to the forklift 10 are the target blocks. When the detection distance is 12, the second blocks CR12 and CL12 which are farthest from the forklift 10 are the target blocks.

Next, at Step S11, the object detection device 41 determines whether or not the detection distance is the maximum value or less. The object detection device 41 determines whether or not people are present in order from the second blocks CR1 and CL1 which are the closest to the forklift 10 at Steps S12 to S22. In the present embodiment, the number of the second blocks CR1 to CR12, and CL1 to CL12 is twelve for each of the turning areas CR and CL. Accordingly, the maximum value of the detection distance is 12. That is, at Step S11, the object detection device 41 determines whether or not it has been determined whether or not people are present in all the second blocks CR1 to CR12, and CL1 to CL12. When a determination result is YES at Step S11 (YES at step S11), the object detection device 41 executes Step S12. On the other hand, when the determination result is NO at Step S11 (NO at S11), the object detection device 41 ends the object detection process.

At Step S12, the object detection device 41 determines whether or not objects O are present in each of the second blocks CR1 to CR12 of the first turning area CR. The second blocks CR1 to CR12 as to which determination of whether or not objects O are present at Step S12 is performed have an order corresponding to a length of the detection distance. As described above, when the detection distance is 1, the object detection device 41 determines whether or not objects O are present in the second block CR1 which is the closest to the forklift 10. When the detection distance is 2, the object detection device 41 determines whether or not objects O are present in the second block CR2 which is the second closest to the forklift 10. When a determination result is YES at Step S12 (YES at step S12), the object detection device 41 executes Step S13. On the other hand, when the determination result is NO at Step S12 (NO at step S12), the object detection device 41 executes Step S17.

At Step S13, the object detection device 41 extracts the object O which is the closest to the forklift 10 of the objects O whose presence in the second blocks CR1 to CR12 is determined at Step S12 as a neighboring object O1. When a single object O is present in each of the second blocks CR1 to CR12, the single object O is defined as the object O which is the closest to the forklift 10. When a plurality of objects O are present in each of the second blocks CR1 to CR12, the object O whose X-coordinate Xw is the closest to zero (the object O that is located closest to the origin OP) of the plurality of objects O is defined as the object O which is the closest to the forklift 10. It is noted that the object O which is the closest to the forklift 10 of the plurality of objects O may be defined as the object O which has the shortest Euclidean distance from the origin OP.

Next, at Step S14, the object detection device 41 performs the person detection process in which it is determined whether or not the neighboring object O1 extracted at Step S13 is a person. The process performed at Step S14 is the same as the process performed at Step S34. That is, the object detection device 41 transforms the coordinates of the neighboring object O1 in the world coordinate system extracted at Step S13 into the coordinates of the neighboring objects O1 in the first image I1, and performs the person detection process on the coordinates of the neighboring object O1 in the first image I1.

Next, at Step S15, the object detection device 41 performs the increment process in which 1 is added to the number of times of the person detection process.

Next, at Step S16, the object detection device 41 determines whether or not the number of times of the person detection process is less than the maximum value determined in advance. The maximum value determined in advance is set to the number of times in which the person detection process may be performed in the control period. When the person detection process is performed on all the neighboring objects O1 in the detection area DA, there is fear that the control period is excessively long. Thus, the control period is restrained from being excessively long by limiting the number of the neighboring objects O1 on which the person detection process is performed. When a determination result is YES at Step S16 (YES at S16), the object detection device 41 executes Step S17. On the other hand, when the determination result is NO at Step S16 (NO at S16), the object detection device 41 ends the object detection process. The object detection device 41 determines whether or not people are present in the each of the second blocks CR1 to CR12 of the first turning area CR by executing Steps S12 to S16.

Processes at Steps S17 to S21 are similar to the processes at Steps S12 to S16, and performed on the second turning area CL. At Step S17, the object detection device 41 determines whether or not objects O are present in each of the second blocks CL1 to CL12 of the second turning area CL by performing a process similar to the process at Step S12 on each of the second blocks CL1 to CL12 of the second turning area CL. When a determination result is YES at Step S17 (YES at S17), the object detection device 41 executes Step S18. On the other hand, when the determination result is NO at Step S17 (NO at S17), the object detection device 41 executes Step S22.

At Step S18, the object detection device 41 extracts the object O that is closest to the forklift 10 of the objects O that are present in each of the second blocks CL1 to CL12 of the second turning area CL as the neighboring object O1 by performing a process similar to the process at Step S13 on each of the second blocks CL1 to CL12 of the second turning area CL. The object detection device 41 serves as a neighboring object extraction unit at Steps S13, S18 and S33.

A process at Step S19 is similar to the process at Step S14. The object detection device 41 performs the person detection process on the neighboring object O1 extracted at Step S18. The object detection device 41 serves as a coordinate transformation unit and a person determination unit at Steps S14, S19, and S34. A process at Step S20 is similar to the process at Step S15. A process at Step S21 is similar to the process at Step S16. When a determination result is YES at Step S21 (YES at S21), the object detection device 41 executes Step S22. On the other hand, when the determination result is NO at Step S21 (NO at S21), the object detection device 41 ends the object detection process.

At Step S22, the object detection device 41 performs the increment process in which 1 is added to the detection distance. Next, the object detection device 41 executes the process at Step S11. Accordingly, the processes at Steps S12 to S22 are repeated until NO is determined at Step S11.

While the object detection process is performed, the person detection process is performed on the neighboring object O1 that is the closest to the forklift 10 of the objects O that are present in each of the blocks F1 to F3, CR1 to CR12, and CL1 to CL12. That is, the object detection device 41 extracts the neighboring object O1 that is present in each of the blocks F1 to F3, CR1 to CR12, and CL1 to CL12 for each of the first blocks F1 to F3, the second blocks CR1 to CR12, and the second blocks CL1 to CL12, and determines whether or not the neighboring object O1 is a person. Coordinates of the neighboring objects O1 in the first image I1 are shown by frames A1 of a dash-dot line in FIG. 8.

Figure 8:
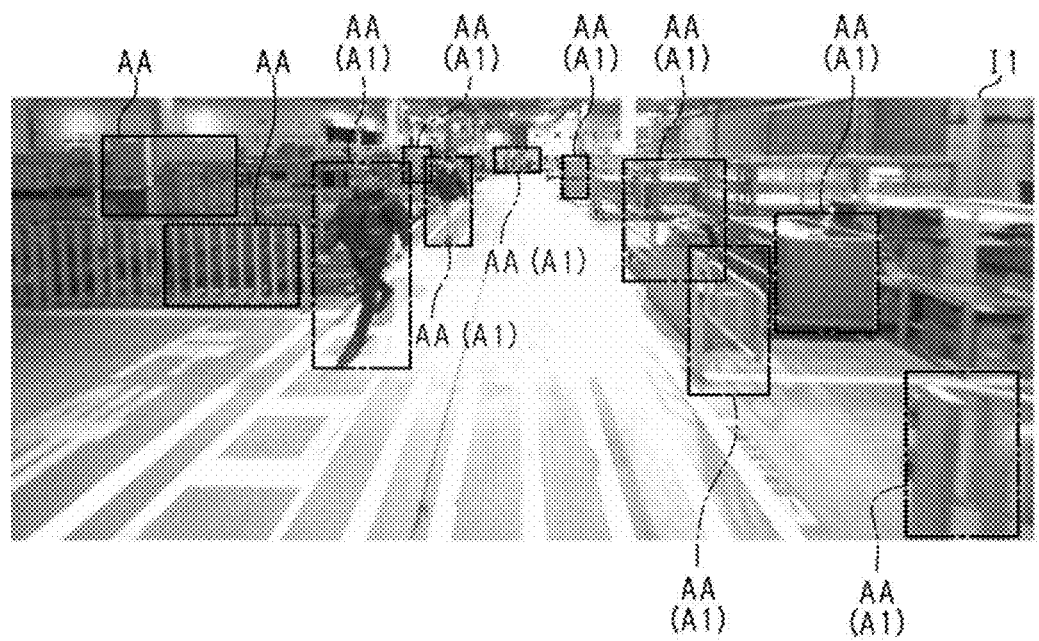
FIG. 8 is an explanatory view of areas in which a person detection process is performed in the first image of FIG. 3.

The object detection device 41 performs the person detection process in an area of each of the frames A1, as shown in FIG. 8. Thus, the person detection process is performed on the coordinates of the neighboring objects O1 in the first image I1. In the present embodiment, the person detection process is performed on only the neighboring objects O1, while not performed on the objects O which are not the neighboring objects O1. That is, the object detection device 41 prioritizes the neighboring objects O1 over the objects O which are not the neighboring objects O1, and performs the person detection process on the coordinates of the neighboring objects O1 in the first image. The term "prioritize" means that the present disclosure includes an aspect in which the person detection process is performed on only the coordinates of the neighboring objects O1 in the first image I1, as described above.

As described above, the object detection device 41 includes the object extraction unit, the neighboring object extraction unit, the coordinate transformation unit, and the person determination unit as functional elements that are operated by executing programs determined in advance.

The following will describe operations according to the present embodiment.

While the forklift 10 travels straight, the forklift 10 passes through the front area F in the Y-direction. In a case where the forklift 10 travels straight, a path along which the forklift 10 passes is the path extending in the Y-direction when the object detection process starts to be performed. The object detection device 41 partitions the XY-plane in such a manner that the first blocks F1 to F3 are located in the front area F, and determines whether or not the neighboring object O1 in each of the first blocks F1 to F3 is a person, so that the object detection device 41 may detect whether or not people that may block the traveling of the forklift 10 are present while the forklift 10 travels straight. That is, the object detection device 41 detects whether or not the people are present on the rear side of the forklift 10 in the path along which the forklift 10 passes, while the forklift 10 travels straight.

While the forklift 10 turns, the forklift 10 passes through the turning areas CR and CL in directions intersecting the X-direction and the Y-direction. The path along which the forklift 10 passes extends in the Y-direction when the object detection process starts to be performed. In a case where the forklift 10 turns, the path is to be shifted in the X-direction. Thus, in the case where the forklift 10 turns, the path along which the forklift 10 passes is the path extending in the directions intersecting the X-direction and the Y-direction when the object detection process starts to be performed.

Providing that the whole detection area DA in the XY-plane is divided into the first blocks, the object that is closest to the forklift 10 in the Y-direction is extracted as the neighboring object for each of the first blocks of the turning areas CR and CL. However, while the forklift 10 turns as described above, the path along which the forklift 10 passes is shifted in the X-direction relative to the Y-direction, so that an object that does not block the traveling of the forklift 10 may be extracted as the neighboring object, when the object that is closest to the forklift 10 in the Y-direction is defined as the neighboring object. Then, a case occurs where while the person detection process is performed on the object that does not block the traveling of the forklift 10, the person detection process is not performed on an object that blocks the traveling of the forklift 10. Thus, while the forklift 10 turns, it is required that whether or not people are present in both of the X-direction and the Y-direction based on the forklift 10 may be detected.

In the present embodiment, the XY-plane in the world coordinate system is partitioned into the plurality of the second blocks CR1 to CR12, and CL1 to CL12, which are arranged in the Y-direction and located in the turning areas CR and CL, respectively. The object detection device 41 determines whether or not the neighboring object O1 is a person in each of the second blocks CR1 to CR12, and CL1 to CL12, so that the object detection device 41 may detect whether or not people that may block the traveling of the forklift 10 are present, while the forklift 10 turns. In detail, when a plurality of people are arranged in the X-direction, the person detection process is performed on the neighboring object O1 that is the closest object O to the forklift 10 in each of the second blocks CR1 to CR12, and CL1 to CL12, so that people that may block the traveling of the forklift 10 in the X-direction may be detected. When a plurality of people are arranged in the Y-direction, the person detection process is performed in each of the second blocks CR1 to CR12, and CL1 to CL12 by forming the plurality of second blocks CR1 to CR12, and CL1 to CL12 in the Y-direction, so that people that may block the traveling of the forklift 10 in the Y-direction may be detected. That is, the object detection device 41 detects whether or not the people are present in the left and right direction as well as the rear side of the forklift 10 in the path along which the forklift 10 passes during the turning. Thus, people that may block the traveling of the forklift 10 may be detected by partitioning the XY-plane into the blocks F1 to F3, CR1 to CR12, and CL1 to CL12 which are matched with the path along which the forklift 10 passes.

The object detection device 41 individually extracts the neighboring object O1 for each of the blocks F1 to F3, CR1 to CR12, and CL1 to CL12, and determines whether or not the neighboring object O1 is a person. The neighboring object O1 that is closest to the forklift 10 means the object O that may block the traveling of the forklift 10 immediately. On the other hand, the object O that is not the neighboring object O1 is farther from the forklift 10 than the neighboring object O1 and additionally, after the forklift 10 travels and passes the neighboring object O1, the object O may be the neighboring object O1. Accordingly, when the object O that is not the neighboring object O1 may block the traveling of the forklift 10, the person detection process is performed on the object O in the next or subsequent control period. This means that the object O that is not the neighboring object O1 has a low priority for the person detection process, compared with the neighboring object O1. Thus, it is considered that a practical issue does not occur by extracting the neighboring object O1 and determining whether or not the neighboring object O1 is a person, even if the person detection process is not performed on the object O that is not the neighboring object O1.

In the forklift 10, when a person is detected, a different process from the process performed when the object O except for people is detected may be performed. For example, when the monitoring device 30 includes an alarm unit, the object detection device 41 alarms the driver of the forklift 10 that there is a person near the forklift 10 by the alarm unit. The alarm unit includes, for example, an indicator that alarms the driver by a display and a buzzer that alarms the driver by sound. In addition, when a person is detected, the object detection device 41 may alarm people around the forklift 10 so as to make a recognition that the forklift 10 is located near the people. When the detection result of the object detection device 41 is output to the main controller 20, the main controller 20 may perform a vehicle speed control, such as decreasing the vehicle speed of the forklift 10, and setting an upper limit of the vehicle speed.

Here, the object detection process is repeated every specified control period. In the object detection process, the person detection process in which whether or not the objects O are people is determined has a large processing load of the object detection device 41. When the person detection process is performed on the entire area of the first image I1, the processing load is increased. Since the forklift 10 makes a tight turn more frequently compared with a passenger vehicle, the stereo camera 31 which has a wider angle of view than that of the stereo camera mounted on the passenger vehicle is often used for the forklift 10. Accordingly, the object detection device 41 mounted on the forklift 10 tends to have significantly many areas in which the person detection process is performed, so that the processing load of the object detection device 41 tends to be increased.

When the processing load of the object detection device 41 is large, the person detection process may not be sometimes performed on all the objects O in the control period. Providing that the person detection process is performed on all the objects O in the order from the object O that is closer to the forklift 10, it may occur that the person detection process is performed on the object O that does not block the traveling of the forklift 10 prior to the object O that blocks the traveling of the forklift 10. Then, the person detection process may not be performed on the object O that blocks the traveling of the forklift 10 in the control period, so that it may occur that the people that block the traveling of the forklift 10 is not detected, or detection of such a people may be delayed. When the person detection process is performed on all the objects O in the first image I1 without changing the control period, an object detection device which has a high processing power is required. This increases a manufacturing cost of the object detection device. In addition, when the person detection process is performed on all the objects O without changing the processing power of the object detection device 41, a longer control period is required, so that the detection of the people which blocks the travelling the forklift 10 is delayed.

In the present embodiment, the object detection device 41 extracts the neighboring object O1 that may block the travelling of the forklift 10 for each of the blocks F1 to F3, CR1 to CR12, and CL1 to CL12, and determines whether or not the neighboring object O1 is a person. The object detection device 41 only needs to determine at least whether or not the neighboring object O1 is a person, so that the processing load of the object detection device 41 is smaller than that of the object detection device 41 which performs the person detection process on all the objects O. In addition, the control period only needs to be set so as to determine whether or not the neighboring object O1 is a person. This restrains the control period from being long compared with the case where the object detection device 41 performs the person detection process on all the objects O.

It is noted that if the object detection device 41 obtains steering information such as a steering angle and a handle angle from the main controller 20, the path along which the forklift 10 passes may be obtained in advance. In this case, the object O that is located in the path along which the forklift 10 passes may be extracted as the neighboring object O1. However, in a case where the object detection device 41 may not obtain the steering information, such as a case where the main controller 20 and the object detection device 41 are not connected with each other, the neighboring object O1 may not be extracted from the path along which the forklift 10 passes. Then, when the neighboring object O1 may not be extracted, the object detection device 41 needs to determine whether or not all the objects O are people. This increases the processing load of the object detection device 41.

On the contrary, in the present embodiment, the XY-plane of the world coordinate system is divided into the plurality of blocks F1 to F3, CR1 to CR12, and CL1 to CL12, and the neighboring object O1 is extracted for each of the blocks F1 to F3, CR1 to CR12, and CL1 to CL12. The path along which the forklift 10 travels straight and the path along which the forklift 10 turns have different blocks F1 to F3, and CR1 to CR12 and CL1 to CL12, respectively. Thus, the neighboring object O1 that may block the travelling of the forklift 10 when the forklift 10 travels straight and the neighboring object O1 that may block the travelling of the forklift 10 when the forklift 10 turns may be extracted. Therefore, even when the steering information is not obtained from the main controller 20, the neighboring object O1 on which the person detection process needs to be performed, of the plurality of objects O, may be extracted.

The following will describe advantages according to the present embodiment.

(1) The XY-plane of the world coordinate system is partitioned into the first blocks F1 to F3 and the second blocks CR1 to CR12, and CL1 to CL12 in accordance with the path along which the forklift 10 passes. With this method, the object detection device 41 may extract the neighboring objects O1 that may block the travelling of the forklift 10. The object detection device 41 performs a detection of people by determining whether or not the neighboring objects O1 are people. Providing that the person detection process is performed by using an image captured by a monocular camera, coordinates in an area in which people are detected in the world coordinate system are derived after the person detection process is performed in the entire area of the image. In this case, a processing load of the object detection device 41 is increased because the area in which the person detection process is performed is large. On the contrary, the coordinates of the neighboring objects O1 in the world coordinate system are transformed into the coordinates in the first image I1 captured by the stereo camera 31, and the person detection process is performed on the coordinates in the first image I1. This may decrease the processing load of the object detection device 41 because the area in which the person detection process is performed is smaller, compared with the case where the person detection process is performed on the entire area of the first image I1.

(2) The front area F is partitioned into a plurality of the first blocks F1 to F3 which are arranged in the X-direction in the world coordinate system. The neighboring object O1 is extracted for each of the first blocks F1 to F3 by partitioning the front area F to the plurality of the first blocks F1 to F3. The object detection device 41 may finely determine whether or not people are present in the front area F, compared with the case where the front area F is one first block.

(3) The object detection device 41 obtains the disparity image from the image captured by the stereo camera 31, and derives the coordinates of the particular point in the world coordinate system from the disparity image. The coordinates of the particular point obtained from the disparity image in the world coordinate system and the coordinates in the first image I1 may be mutually transformed. Accordingly, extracting the neighboring objects O1 by using the image captured by the stereo camera 31 may improve an accuracy of the coordinates of the neighboring objects O1 in the first image I1.

(4) The object detection device 41 determines whether or not people are present in the front area F prior to the turning areas CR and CL. The people that are present in the front area F are likely to block the travelling of the forklift 10 compared with the people that are present in the turning areas CR and CL. The people that block the travelling of the forklift 10 may be quickly detected by determining whether or not people are present in the front area F prior to the turning areas CR and CL.

The embodiment according to the present disclosure may be modified as follows. The embodiment and the following modifications may be combined with each other, as long as there is no technical contradiction.

The number of neighboring objects O1 on which the person detection process is performed may have an upper limit. The upper limit is, for example, a value determined in accordance with the control period, and set to the number of times in which the person detection process may be performed in the control period. In this case, the object detection device 41 performs the person detection process on the neighboring object O1 in each of the first blocks F1 to F3, and then, on the neighboring objects O1 in each of the second blocks in order from the neighboring object O1 in the second block that is closer to the forklift 10. That is, the object detection device 41 determines whether or not people are present in the front area F prior to the turning areas CR and CL, and then, determines whether or not people are present in the turning areas CR and CL.

Figure 9:
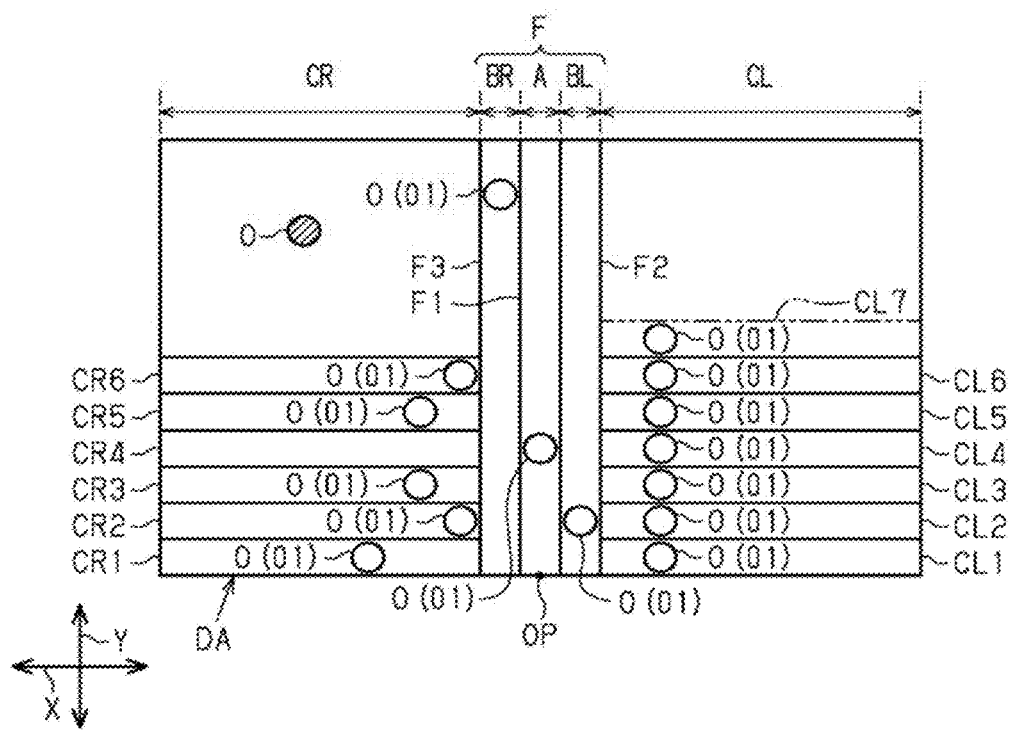
FIG. 9 is an explanatory view of a modification of the object detection process.

In an example illustrated in FIG. 9, the upper limit is set to 15. When the objects O are present in three of the first blocks F1 to F3, six blocks of CR1 to CR6 which are arranged in order from the block closer to the forklift 10 in the first turning are CR, and six blocks of CL1 to CL6 which are arranged in order from the block closer to the forklift 10 in the second turning area CL, the object detection device 41 determines whether or not the neighboring objects O1 that are present in these blocks are people. On the other hand, when the object O is not present in one block of three of the first blocks F1 to F3 and twelve of the second blocks CR1 to CR6, and CL1 to CL6, the object detection device 41 performs the person detection process on the neighboring object O1 in the second block that is seventh closest to the forklift 10, of the second blocks of the turning areas CR and CL. In the example illustrated in FIG. 9, the object O is not present in the second block CR4 that is fourth closest to the forklift 10, of the second blocks of the first turning area CR, so that a determination of whether or not the neighboring object O1 in the second block CL7 that is seventh closest to the forklift 10 in the second turning area CL is a person is performed. In the example illustrated in FIG. 9, the determination of whether or not the neighboring object O1 of the second block CL7 that is seventh closest to the forklift 10 in the second turning area CL is a person is performed. However, the determination of whether or not the neighboring object O1 of the second block CR7 in the first turning area CR is a people may be performed.

Thus, the object detection device 41 may restrain time required for the person detection process from being excessively longer by setting the upper limit of the number of neighboring objects O1 on which the person detection process is performed. In addition, when the number of blocks in which the objects O are present is small, the determination of whether or not people are present in a place which are located far from the forklift 10 may be performed.

The object detection device 41 may perform the person detection process on the objects O other than the neighboring objects O1, as long as the person detection process is performed in the control period. The term "prioritize" means that the present disclosure includes the aspect in which the person detection process is performed on the neighboring objects O1 prior to the objects O that are not the neighboring objects O1. That is, the object detection device 41 only needs to determine at least whether or not the neighboring objects O1 are people. The object detection device 41 may determine whether or not the neighboring object O1 and the object O that is second closest to the forklift 10 next to the neighboring object O1, of the objects O that are present in each of the blocks F1 to F3, CR1 to CR12, and CL1 to CL12 are people.

The monitoring device 30 may include a laser range finder and a monocular camera instead of the stereo camera 31. A two-dimensional laser range finder that emits a laser beam while changing an emission angle in the horizontal direction is used as the laser range finder. When a point on which the laser beam is hit is defined as an emission point, the laser range finder may measure a distance between the laser range finder and the emission point by correlating the distance with the emission angle. That is, coordinates of the emission point may be measured when a position of the laser range finder is defined as an origin. The coordinates measured by the laser range finder are coordinates in a real space in the world coordinate system. The laser range finder outputs a measurement result to the object detection device 41. When using the laser range finder, the emission point expresses a part of the object O.

The object detection device 41 extracts a point group which is a set of emission points as one object O. The extraction of the object O may be performed by the same method as the method in which the extraction of the object O is performed by using the particular points. That is, the object detection device 41 extracts the point group obtained by the clustering of a plurality of emission points as the object O. The object detection device 41 extracts the neighboring object O1 from the objects O. The extraction of the neighboring object O1 may be performed by the same method as that described in the present embodiment. Thus, the object detection device 41 extracts the objects O from a result measured by the laser range finder instead of the image captured by the stereo camera 31, and extracts the neighboring object O1 from the objects O.

When extracting the neighboring object O1, the object detection device 41 transforms the coordinates of the neighboring object O1 in the world coordinate system into coordinates in an image captured by the monocular camera as a camera. The coordinates in the world coordinate system have a correlation with the coordinates in the image. Accordingly, the coordinates in the world coordinate system may be transformed into the coordinates in the image captured by the monocular camera by obtaining the correlation between the coordinates in the world coordinate system and the coordinates in the image in advance, and making a correlation map and the like. The object detection device 41 performs the person detection process on the coordinates of the neighboring object O1 in the image. With this process, the object detection device 41 determines whether or not the neighboring object O1 is a person.

The monitoring device 30 only needs to include a sensor with which the object detection device 41 may detect the objects around the forklift 10 as point groups. The monitoring device 30 may include a radar such as a millimeter wave radar instead of the laser range finder. In addition, a three-dimensional laser range finder may be used.

The object detection device 41 may determine whether or not people are present in the turning areas CR and CL prior to the front area F. In addition, the object detection device 41 may determine whether or not people are present in the front area F and in the turning areas CR and CL at the same time.

In the object detection process, it only needs to be determined whether or not a person is present for each of the blocks F1 to F3, CR1 to CR12, and CL1 to CL12. The procedure and processing details of the object detection process performed by the object detection device 41 may be changed as appropriate. For example, after extracting the neighboring objects O1 in all the blocks of F1 to F3, CR1 to CR12, and CL1 to CL12, the object detection device 41 may determine whether or not the extracted neighboring objects O1 are people. In the present embodiment, the person detection process is performed every time the object detection device 41 extracts the neighboring object O1 from each of the blocks F1 to F3, CR1 to CR12, and CL1 to CL12. On the contrary, after the neighboring objects O1 are extracted from all the blocks F1 to F3, CR1 to CR12, and CL1 to CL12, the person detection process is performed in this modification. In addition, the object detection device 41 may determine whether or not the people are present in the second turning area CL prior to the first turning area CR.

Steps S6, S15, S16, S20, S21, and S32 may be omitted from the object detection process. In this case, the object detection device 41 determines whether or not people are present in all the blocks of F1 to F3, CR1 to CR12, and CL1 to CL12.

The front area F does not need to be divided into three of the first blocks F1 to F3. In this case, the whole front area F is a single first block.

The number of first blocks may be changed as appropriate. Similarly to the first block, the number of second blocks may be changed as appropriate.

The detection area DA does not need to be determined. In this case, the same effect as that of the embodiment may be obtained by partitioning the XY-plane in the world coordinate system into the first blocks F1 to F3, the second blocks CR1 to CR12, and CL1 to CL12.

The object detection process may be always performed while the forklift 10 is in a starting state. That is, the object detection process may be performed also when the forklift 10 travels forward.

The monitoring device 30 may detect people that are located on the front side of the forklift 10. In this case, the stereo camera 31 is disposed in such a manner that the stereo camera 31 captures the front side of the forklift 10. The object detection device 41 performs the object detection process when the forklift 10 travels forward. In addition, the monitoring device 30 may detect people that are located on both sides of the front side and the rear side of the forklift 10. In this case, two stereo cameras 31 are disposed. One of the stereo cameras 31 captures the front side of the forklift 10, and the other of the stereo cameras 31 captures the rear side of the forklift 10.

The determination of whether or not the objects O are people may be performed by using a person determination unit which has executed a machine learning algorithm of a supervised learning model. For example, a supervised learning machine having an algorithm such as a support vector machine, a neural network, a Naive Bayes, a deep learning, and a decision tree is employed as the person determination unit. Training data used for the machine learning algorithm includes unique image components such as shape elements of people extracted from an image and appearance elements. The shape elements include, for example, a size and an outline of people. The appearance elements include, for example, light source information, texture information, and camera information. The light source information includes, for example, information about a reflection rate, shade, and the like. The texture information includes color information, and the like. The camera information includes image quality, an image resolution, an angle of view, and the like.

In the present embodiment, the object detection device 41 determines whether or not the objects O are the neighboring objects O1 from the coordinates of the objects O in the XY-plane in the world coordinate system. However, the object detection device 41 may determine whether or not the objects O are the neighboring objects O1 by using coordinates in a three-axis orthogonal coordinate system. The coordinates of the objects O in the three-axis orthogonal coordinate system includes the Z-coordinate Zw.

The forklift 10 may automatically perform a travelling operation and a cargo handling operation. When the forklift 10 which automatically performs the travelling operation and the cargo handling operation is used, the forklift 10 may change a path and vehicle speeds in accordance with whether or not the objects O are people. For example, when the forklift 10 avoids an object O, the main controller 20 may set an avoidance distance between the forklift 10 and the object O when the object O is a person larger than between the forklift 10 and the object O when the object O is not people, and set the vehicle speeds at which the forklift 10 travels near the object O when the object O is a person lower than that when the object O is not people. In addition, the forklift 10 may switch between automatic operation and manual operation.

The world coordinate system is not limited to an orthogonal coordinate system, and may be a polar coordinate system.

The world coordinate system may be a coordinate system in which a middle point in the X-direction of the stereo camera 31 is defined as the origin OP.

The object detection device 41 may detect people from the second image of the images captured by the stereo camera 31. The object detection device 41 derives coordinates of the neighboring object O1 in the second image. However, since the second image is a comparative image, the coordinates of the neighboring objects O1 in the image are shifted in accordance with the base line length when derived from the world coordinates of the neighboring objects O1. Thus, the object detection device 41 corrects the coordinates of the neighboring objects O1 in the second image in accordance with the base line length, and performs the person detection process on the corrected coordinates.

The object detection device 41 may send and receive data to/from the main controller 20 by communication in accordance with a communication protocol for the vehicle, such as CAN: Controller Area Network and LIN: Local Interconnect Network. In this case, the main controller 20 may perform a process in accordance with the measurement result of the object detection process. For example, as described in the embodiment, when the main controller 20 limits the vehicle speed and operates the alarm unit, the object detection device 41 and the main controller 20 are configured to be communicable with each other. On the other hand, when the monitoring device 30 includes the alarm unit and the object detection device 41 operates the alarm unit, the object detection device 41 and the main controller 20 does not need to be configured to be communicable with each other.

The object extraction unit, the neighboring object extraction unit, the coordinate transformation unit, the person determination unit, the disparity image acquisition unit, and the coordinate derivation unit may be different device from one another.

The transformation from the camera coordinates into the world coordinates may be performed by table data. A table data in which the Y-coordinate Yw is correlated with a combination of the Y-coordinate Yc and the Z-coordinate Zc, and a table data in which the Z-coordinate Zw is correlated with a combination of the Y-coordinate Yc and the Z-coordinate Zc are used as the table data. The Y-coordinate Yw and the Z-coordinate Zw in the world coordinate system may be obtained from the Y-coordinate Yc and the Z-coordinate Zc in the camera coordinate system by storing these table data in a ROM, and the like of the object detection device 41. Similarly to the above transformation, the transformation from the world coordinate system into the camera coordinate system may be performed by the table data.

The first camera 32 and the second camera 33 may be arranged in the vertical direction of the forklift 10.

The pixel counts of the first image I1 may be different from the pixel counts of the second image. For example, the pixel counts of the second image, which is a comparative image may be the same as the pixel counts of the disparity image, and the pixel counts of the first image I1, which is the base image may be more than the pixel counts of the second image.

The stereo camera 31 may include three or more camera.

The stereo camera 31 may be attached to any position, such as the cargo handling apparatus 16.

The forklift 10 may travel by an engine drive. In this case, the traveling control device controls an amount of fuel injection to an engine, and the like.

The object detection device 41 may be mounted on, for example, an industrial vehicle other than the forklift 10 such as a construction machine, an automated guided vehicle, and a truck; and a passenger vehicle.

What is claimed is:

1. An object detection device configured to be mounted on a vehicle, comprising:
   a camera that is a stereo camera located on a rear side of the vehicle and configured to capture a video that includes an image which is an aerial view image of a road surface, on which the vehicle travels, from an upper side of the rear side of the vehicle;
   a memory that stores a program;
   a processor that executes the program stored in the memory, the processor configured to:
   extract a point group that is a set of points, from among a plurality of particular points, representing a part of an object as the object in a world coordinate system in a real space, wherein an X-axis extends in a vehicle width direction of the vehicle in a horizontal direction and a Y-axis extends orthogonal to the X-axis in the horizontal direction;

from among a plurality of objects that have been extracted, determine a neighboring object in an XY-plane of the world coordinate system, the XY-plane being partitioned in such a manner that a first block whose dimension along the Y-axis is larger than that along the X-axis is located in a front area and second blocks whose dimensions along the Y-axis each are smaller than that along the X-axis are arranged in a direction in which the Y-axis extends and located in turning areas, the front area facing the vehicle in the direction in which the Y-axis extends, the turning areas being adjacent to the front area in a direction in which the X-axis extends, wherein the neighboring object is the object, from among the plurality of objects, which is the closest to the vehicle in each of the first block and the second blocks for each of the first block and the second blocks;

transform coordinates of the neighboring object in the world coordinate system into coordinates of the neighboring object in the image captured by the camera; and perform a person detection process in which it is determined whether or not the neighboring object is a person based on the coordinates of the neighboring object in the image.

2. The object detection device according to claim 1, wherein
the first block includes a plurality of first blocks, and
the front area is partitioned into the plurality of the first blocks which are arranged in the direction in which the X-axis extends in the world coordinate system.

3. The object detection device according to claim 1, wherein
the processor is further configured to:
acquire a disparity image whose pixels are correlated with a disparity obtained by comparing a first image and a second image from the video captured by the stereo camera; and
derive coordinates of the points in the world coordinate system from the disparity image, and
transform the coordinates of the neighboring object in the world coordinate system into the coordinates of the neighboring object in the image captured by the stereo camera.

4. The object detection device according to claim 1, wherein
the number of the neighboring objects on which the person detection process is performed has an upper limit, and
the processor is configured to perform the person detection process on the neighboring objects in the first blocks, and then, on the neighboring objects in the second blocks in an order from the neighboring object of the second block that is closer to the vehicle.

5. A vehicle on which an object detection device according to claim 1 is mounted.

6. The vehicle of claim 5 which is a forklift.

7. An object detection process performed by an object detection device mounted on a vehicle, wherein the object detection device comprises a memory that stores a program and a processor that executes the program stored in the memory, and a camera that is a stereo camera located on a rear side of the vehicle and configured to capture a video that includes an image which is an aerial view image of a road surface, on which the vehicle travels, from an upper side of the rear side of the vehicle, the process comprising the steps of:

extracting a point group that is a set of points, from among a plurality of particular points, representing a part of an object as the object in a world coordinate system in a real space, wherein an X-axis extends in a vehicle width direction of the vehicle in a horizontal direction and a Y-axis extends orthogonal to the X-axis in the horizontal direction;

from among a plurality of objects that have been extracted, determining a neighboring object in an XY-plane of the world coordinate system, the XY-plane being partitioned in such a manner that a first block whose dimension along the Y-axis is larger than that along the X-axis is located in a front area and second blocks whose dimensions along the Y-axis each are smaller than that along the X-axis are arranged in a direction in which the Y-axis extends and located in turning areas, the front area facing the vehicle in the direction in which the Y-axis extends, the turning areas being adjacent to the front area in a direction in which the X-axis extends, wherein the neighboring object is the object, from among the plurality of objects, which is the closest to the vehicle in each of the first block and the second blocks for each of the first block and the second blocks;

transforming coordinates of the neighboring object in the world coordinate system into coordinates of the neighboring object in the image captured by the camera; and performing a person detection process in which it is determined whether or not the neighboring object is a person based on the coordinates of the neighboring object in the image.

8. The object detection process according to claim 7, wherein
the first block includes a plurality of first blocks, and
the front area is partitioned into the plurality of the first blocks which are arranged in the direction in which the X-axis extends in the world coordinate system.

9. The object detection process according to claim 7, further comprising:
acquiring a disparity image whose pixels are correlated with a disparity obtained by comparing a first image and a second image from the video captured by the stereo camera; and
deriving coordinates of the points in the world coordinate system from the disparity image, and
transforming the coordinates of the neighboring object in the world coordinate system into the coordinates of the neighboring object in the image captured by the stereo camera.

10. The object detection process according to claim 7, wherein
the number of the neighboring objects on which the person detection process is performed has an upper limit, and
performing the person detection process on the neighboring objects in the first blocks, and then, on the neighboring objects in the second blocks in an order from the neighboring object of the second block that is closer to the vehicle.

* * * * *